(12) United States Patent
Hoffman et al.

(10) Patent No.: US 10,508,548 B2
(45) Date of Patent: Dec. 17, 2019

(54) TURBINE ENGINE WITH A PLATFORM COOLING CIRCUIT

(71) Applicant: General Electric Company, Schenectady, NY (US)

(72) Inventors: James Michael Hoffman, Hamilton Township, OH (US); Weston Nolan Dooley, West Chester, OH (US); Aaron Ezekiel Smith, Montgomery, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 15/481,628

(22) Filed: Apr. 7, 2017

(65) Prior Publication Data
US 2018/0291742 A1 Oct. 11, 2018

(51) Int. Cl.
*F01D 5/18* (2006.01)
*F01D 5/08* (2006.01)

(52) U.S. Cl.
CPC ............. *F01D 5/081* (2013.01); *F01D 5/187* (2013.01); *F05D 2240/81* (2013.01); *F05D 2250/313* (2013.01); *F05D 2250/314* (2013.01); *F05D 2250/75* (2013.01); *F05D 2260/202* (2013.01)

(58) Field of Classification Search
None
See application file for complete search history.

(56) References Cited

U.S. PATENT DOCUMENTS

| | | | | |
|---|---|---|---|---|
| 5,738,489 | A * | 4/1998 | Lee | F01D 5/18 415/177 |
| 7,249,933 | B2 * | 7/2007 | Lee | F01D 5/143 416/97 R |
| 7,309,212 | B2 | 12/2007 | Itzel et al. | |
| 8,079,814 | B1 * | 12/2011 | Liang | F01D 5/187 415/115 |
| 8,292,587 | B2 * | 10/2012 | Poon | F01D 5/187 415/115 |
| 8,647,064 | B2 * | 2/2014 | Boyer | F01D 5/187 416/193 A |
| 8,657,574 | B2 * | 2/2014 | Amaral | F01D 5/081 416/1 |
| 9,447,691 | B2 * | 9/2016 | Smith | F01D 5/186 |
| 2004/0076519 | A1 * | 4/2004 | Halfmann | B22C 9/04 416/97 R |
| 2007/0134099 | A1 * | 6/2007 | Lee | F01D 5/22 416/193 A |
| 2012/0128465 | A1 * | 5/2012 | Burdgick | F01D 9/02 415/101 |
| 2012/0328451 | A1 * | 12/2012 | Lomas | F01D 5/187 416/97 R |
| 2014/0047843 | A1 * | 2/2014 | Papple | F01D 5/187 60/726 |
| 2014/0093361 | A1 * | 4/2014 | Riley | F01D 25/12 415/178 |

(Continued)

*Primary Examiner* — Michael Lebentritt
(74) *Attorney, Agent, or Firm* — McGarry Bair PC (57) ABSTRACT

An airfoil assembly for a turbine engine can comprise a platform having first and second opposing surfaces, an airfoil extending from the first surface, a base extending from the second surface, and a platform cooling circuit including a feed tube, a first branch, a second branch, and a flow divider.

49 Claims, 4 Drawing Sheets

(56) References Cited

U.S. PATENT DOCUMENTS

| | | | |
|---|---|---|---|
| 2015/0285097 A1* | 10/2015 | Spangler | F01D 25/12 |
| | | | 415/116 |
| 2015/0369056 A1* | 12/2015 | Spangler | B22C 7/06 |
| | | | 416/95 |
| 2016/0108738 A1* | 4/2016 | Devore | F01D 5/18 |
| | | | 415/177 |
| 2016/0169001 A1* | 6/2016 | Thornton | F01D 5/187 |
| | | | 416/95 |
| 2016/0312632 A1* | 10/2016 | Hagan | F01D 9/041 |
| 2017/0298742 A1* | 10/2017 | Johnson | F01D 5/145 |
| 2018/0156049 A1* | 6/2018 | Clum | F01D 9/041 |
| 2018/0163545 A1* | 6/2018 | Bang | F01D 5/18 |
| 2018/0291743 A1* | 10/2018 | Hoffman | F01D 5/081 |
| 2018/0347397 A1* | 12/2018 | Clum | F01D 25/12 |

* cited by examiner

TURBINE ENGINE WITH A PLATFORM COOLING CIRCUIT

BACKGROUND OF THE INVENTION

Turbine engines, and particularly gas or combustion turbine engines, are rotary engines that extract energy from a flow of pressurized combusted gases passing through the engine onto a multitude of rotating turbine blades.

Gas turbine engines for aircraft are designed to operate at high temperatures to maximize engine efficiency, so cooling of certain engine components, such as those in the turbine section, can be beneficial.

BRIEF DESCRIPTION OF THE INVENTION

In one aspect, an airfoil assembly for a turbine engine comprises a platform having first and second opposing surfaces, an airfoil extending from the first surface, a base extending from the second surface, an airfoil cooling circuit passing through the base, platform and into an interior of the airfoil, and a platform cooling circuit comprising first and second branches supplied by a common feed tube, with a flow divider confronting the feed tube and dividing fluid from the feed tube between the first and second branches.

In another aspect, a component for a turbine engine comprises a platform having first and second opposing surfaces, an airfoil extending from the first surface and having an outer wall bounding an interior and defining a pressure side and a suction side extending axially between a leading edge to a trailing edge to define a chord-wise direction and extending radially between a root and a tip to define a span-wise direction, with the root being adjacent the platform, a base extending from the second surface, an airfoil cooling circuit passing through the base, platform and into an interior of the airfoil, and a platform cooling circuit comprising first and second branches supplied by a common feed tube, with a flow divider confronting the feed tube and dividing fluid from the feed tube between the first and second branches.

In yet another aspect, a method of cooling a platform of an airfoil assembly having a platform supporting an airfoil comprises supplying cooling air from a feed tube to at least two cooling branches within the platform, and dividing the supplied cooling air between the at least two cooling branches by directing the cooling air along opposing curved surfaces.

DESCRIPTION OF EMBODIMENTS OF THE INVENTION

The described embodiments of the present invention are directed to a cooling circuit for the platform of an airfoil assembly. For purposes of illustration, the present invention will be described with respect to the turbine for an aircraft turbine engine. It will be understood, however, that the disclosure is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
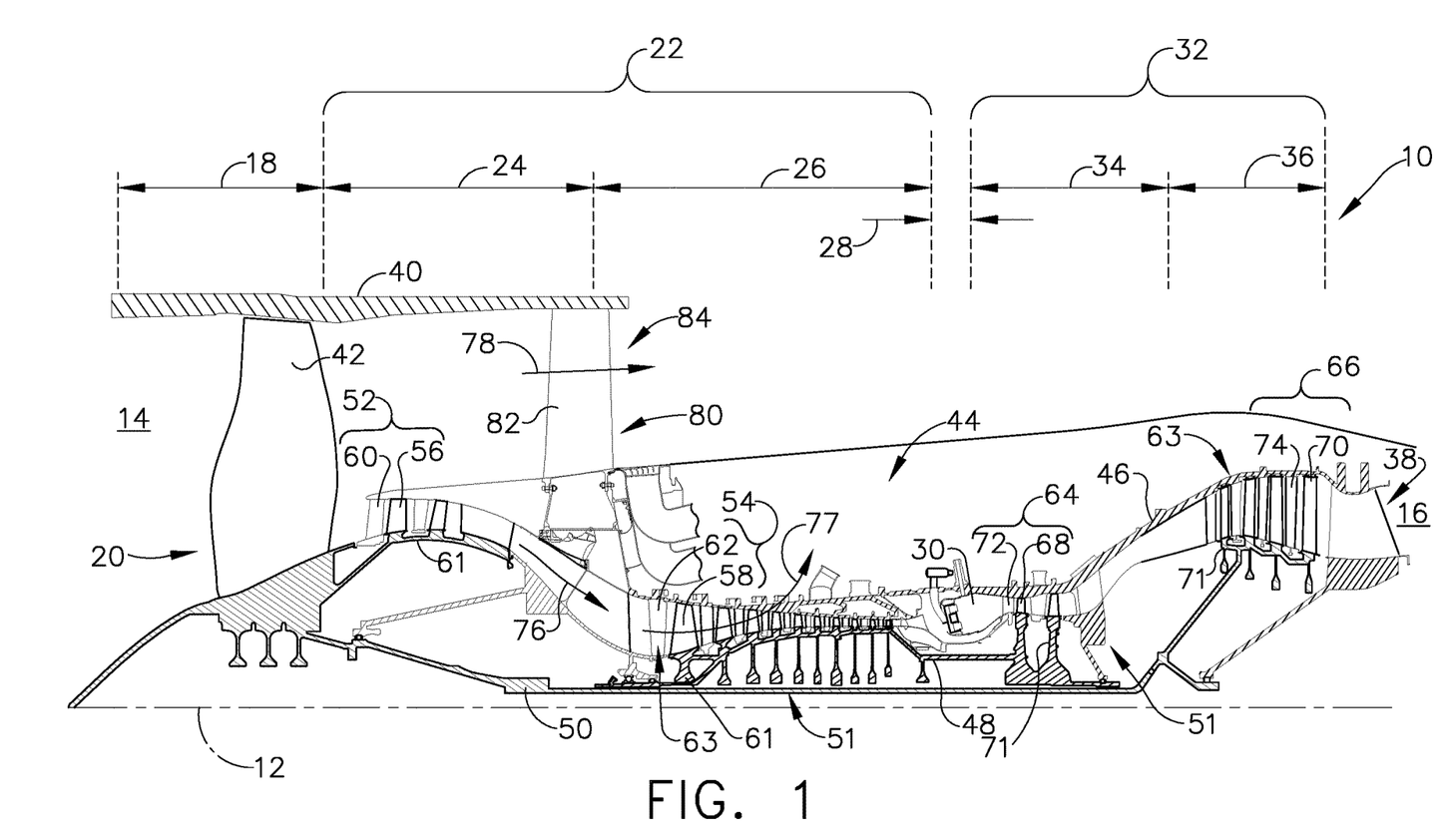
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
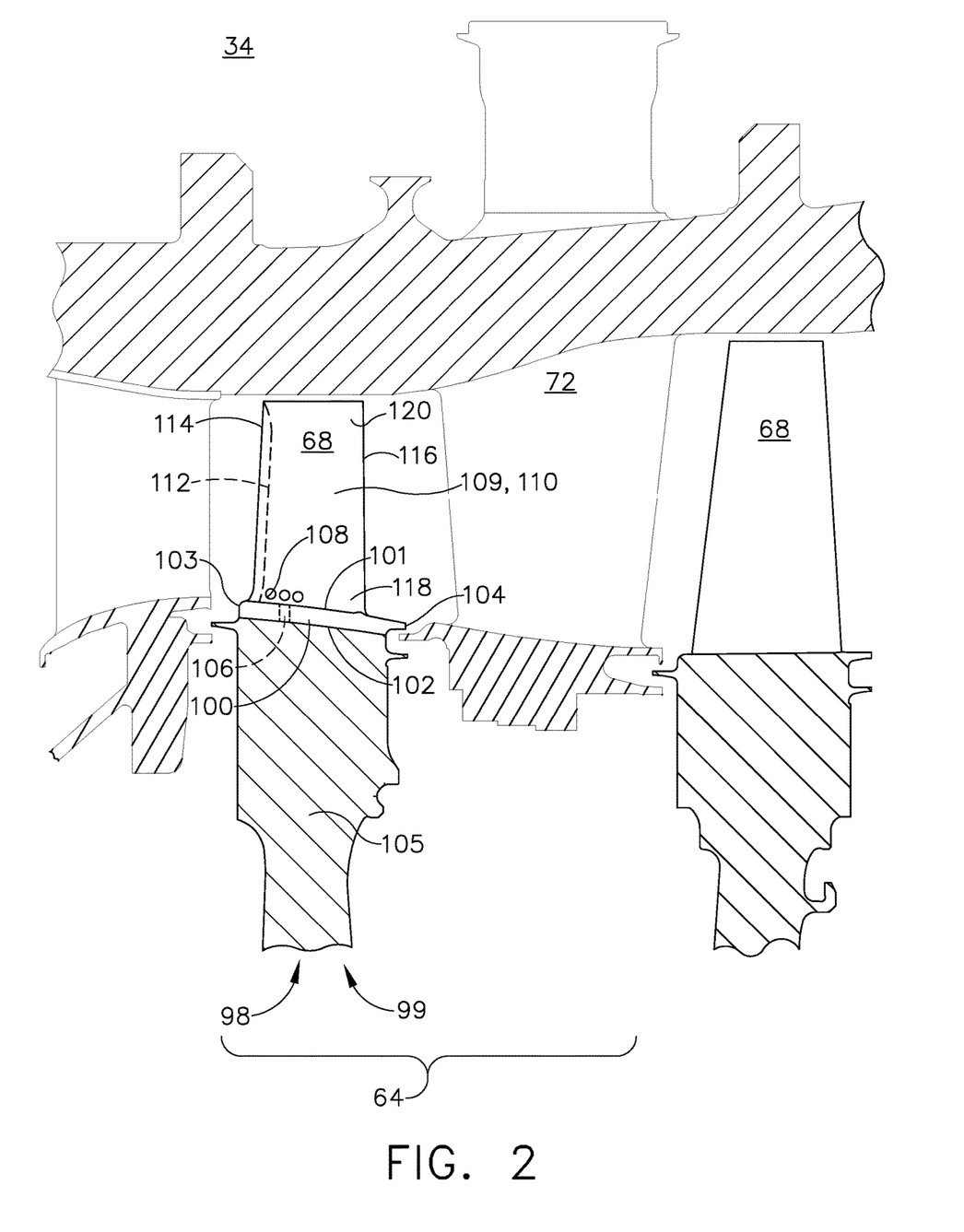
FIG. 2 is a side view of a portion of a turbine in the engine of FIG. 1.

FIG. 2 illustrates a side view of a portion of a turbine, illustrated as the HP turbine 34 in the turbine engine 10 of FIG. 1. The blade 68 is part of an airfoil assembly 99, which is just one example of a component for the turbine engine. In addition, the HP turbine vane 72 can be positioned adjacent the HP turbine blade 68 to form the HP turbine stage 64 as shown.

As illustrated the airfoil assembly 99 can further comprise a platform 100 having a leading edge 103, trailing edge 104, a first surface 101, and a second surface 102 opposite the first surface 101, as well as at least one cooling air hole, illustrated as a film hole 106 having an inlet 107 on the second surface 102 and an outlet 108 on the first surface 101. The airfoil assembly 99 can yet further comprise an airfoil in the form of a turbine blade 68 that can extend from the first surface 101, and a base 105 can extend from the second surface 102. It is contemplated that the base 105 can comprise a dovetail attachment; however, the disclosure is not so limited and any appropriate attachment mechanism is contemplated herein.

The blade 68 can further comprise an outer wall 109 that defines a pressure side 110 and suction side 112 and bounds an interior. The blade 68 can extend in an axial direction between a blade leading edge 114 and blade trailing edge 116 to define a chord-wise direction, and can also extend in a radial direction between a root 118 and tip 120 to define a span-wise direction, where the root 118 is adjacent the platform 100.

Figure 3:
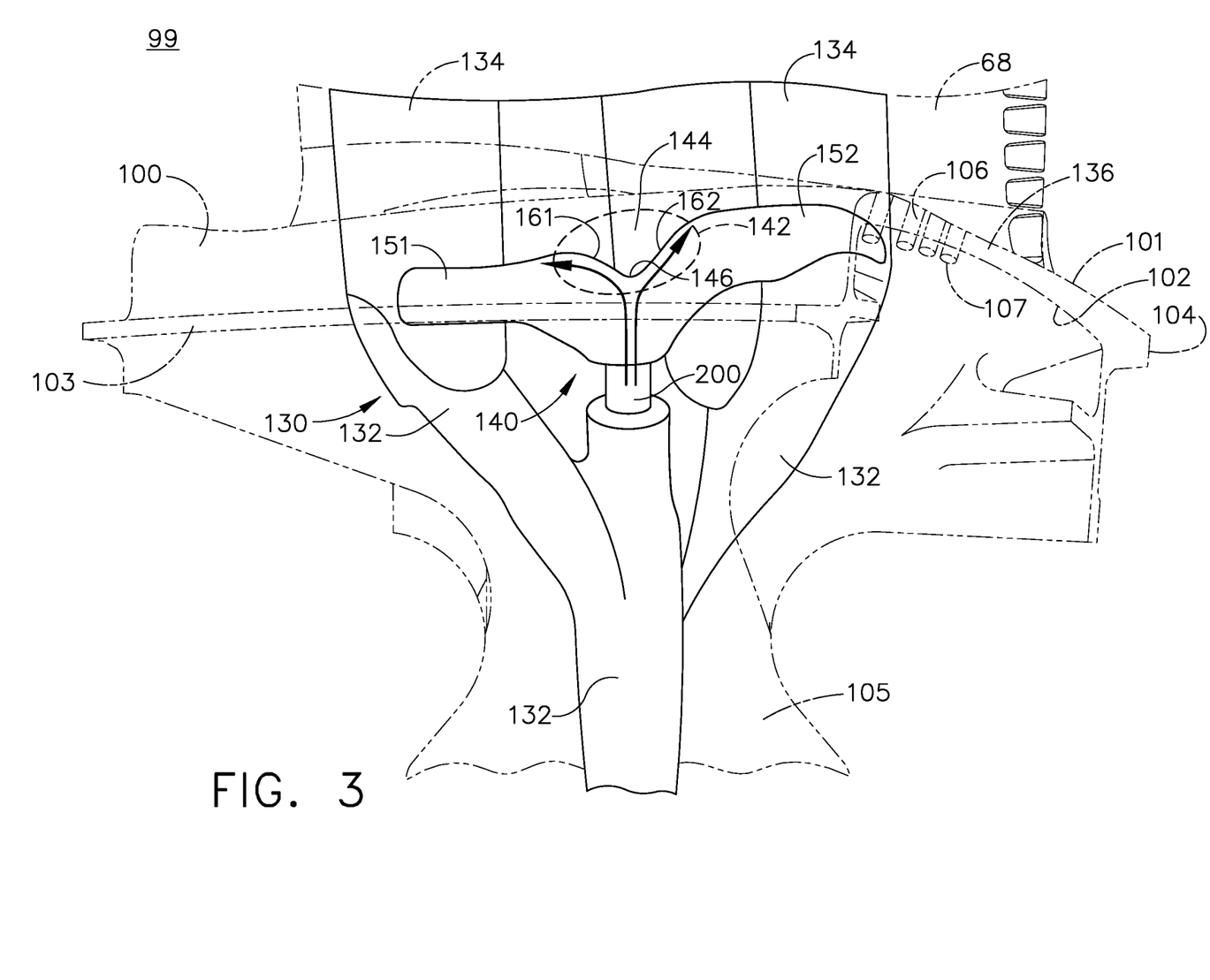
FIG. 3 is a perspective view of an airfoil assembly in the turbine of FIG. 2 including a platform cooling circuit in accordance with various aspects described herein.

FIG. 3 illustrates the airfoil assembly 99 viewed in an axial direction. While illustrated facing the leading edge 103 of the platform 100, it should be understood that the present disclosure can also be applied to similar portions near the trailing edge 104. As seen in FIG. 3, an airfoil cooling circuit 130 (shown in solid lines) comprising a passage 132 is located within the base 105 (shown in dashed lines) and extends through the platform 100 (also shown in dashed lines). A chamber 134 is located within the blade 68 and is fluidly coupled with the passage 132. It is contemplated that there may be multiple passages 132 and chambers 134 within the airfoil assembly 99, and further, that the chamber 134 may comprise any geometry advantageous to the airfoil cooling circuit 130 such as a curved or serpentine arrangement in non-limiting examples. In this manner the airfoil cooling circuit 130 can pass through the base 105, platform 100, and into the chamber 134 within the interior of the blade 68 as shown.

The airfoil assembly 99 can further comprise a platform cooling circuit 140 (also shown in solid lines) including a first branch 151, second branch 152, and feed tube 200. The feed tube 200 can be fluidly coupled to the passage 132 and be a common supply for the first and second branches 151, 152. A flow divider 142 can also be included in the platform cooling circuit 140, illustrated herein as a wedge 144 having a first side 161, a second side 162 opposing the first side 161, and an apex 146 that can confront the feed tube 200 as shown.

It can therefore be appreciated that the solid lines illustrating the airfoil cooling circuit 130 and platform cooling circuit 140 indicate voids within the base 105, platform 100, and blade 68 through which cooling air may be supplied.

The first and second branches 151, 152 can extend from the feed tube 200 and flow divider 142 in different directions adjacent the platform 100; in a non-limiting example, the first branch 151 can extend along the leading edge 103 of the platform 100 while the second branch 152 can extend along a side 136 of the platform 100 as shown. Other combinations are contemplated in the present disclosure, such as one of the branches 151, 152 extending along the trailing edge 104 or to other portions of the platform 100 not illustrated, or the use of any number of branches within the platform 100 as desired. In addition, at least one film hole 106 can be fluidly coupled to either of the first and second branches 151, 152; in this manner, the platform cooling circuit 140 can be fluidly coupled to the airfoil cooling circuit 130 via the feed tube 200 and film holes 106.

Figure 4:
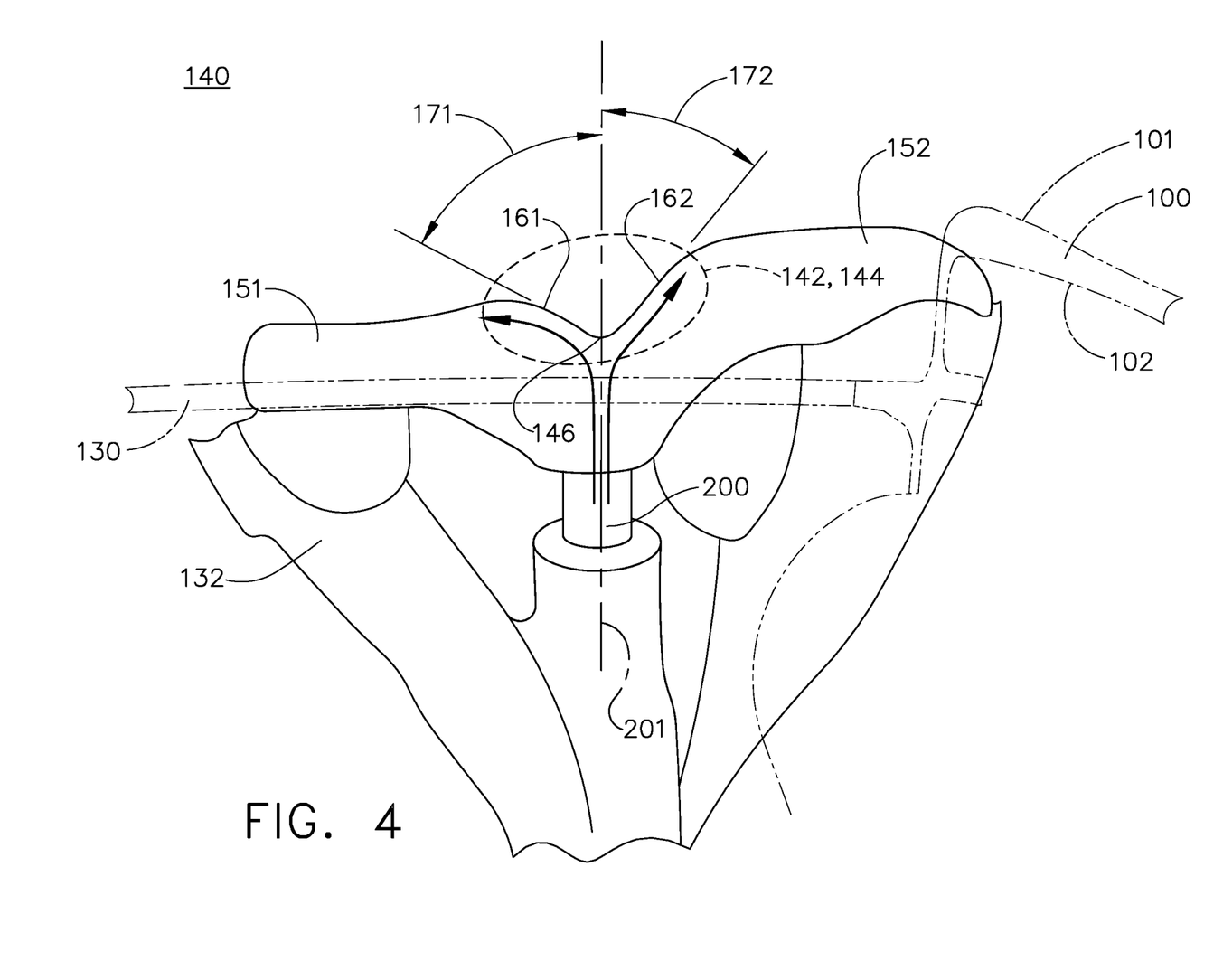
FIG. 4 is a perspective view of a portion of the airfoil assembly of FIG. 3.

The platform cooling circuit 140 is illustrated in further detail in FIG. 4. The first side 161 of the wedge 144 can be formed at a first angle 171 with respect to a centerline 201 of the feed tube 200; similarly, the second side 162 can be formed at a second angle 172 with respect to the centerline 201. In addition, either or both of the sides 161, 162 can have a curvilinear profile within the wedge 144, and the centerline 201 can intersect the apex 146 as shown. It should be appreciated that the flow divider 142 (illustrated as the wedge 144) can have a generally mounded, peaked, or conical structure in three dimensions, with sides that slope away from the platform 100 to define the central apex 146.

The construction of the platform cooling circuit 140 can be accomplished through a number of methods including traditional methods such as drilling, or by additive manufacturing methods, and the wedge 144 can be formed integrally with the second surface 102 of the platform 100. As a result, it is possible to have a lack of discrete boundaries between the wedge 144 and the platform 100.

In operation, cooling air can be supplied through the passage 132 and chamber 134 in the airfoil cooling circuit 130 in order to cool regions within the blade 68. Cooling air can also be supplied through the passage 132 and film holes 106 to cool the first surface 101 of the platform 100. In addition, cooling air can be supplied through the feed tube 200 to cool the second surface 102 of the platform 100. The flow divider 142 can divide the cooling airflow into multiple portions, such as one portion flowing through the first branch 151 and another portion flowing through the second branch 152 (illustrated as arrows in FIGS. 3 and 4), in order to supply cooling air to different portions of the platform 100 from within the base 105. The sides 161, 162 of the flow divider 142 can be shaped or angled so as to evenly divide the airflow between the branches 151, 152. Alternately, the flow divider 142 may also divide the flow unevenly to supply a greater amount of cooling air to a desired region of the platform 100. In addition, the branches 151, 152 may contain air flows with different sink pressures, and the use of uneven airflow division can provide cooling air to all branches regardless of internal pressure differences.

In the manner described above, a method of cooling the platform 100 that supports the blade 68 can comprise supplying cooling air from the feed tube 200 to at least two cooling branches within the platform 100, such as the first branch 151 and second branch 152, and dividing the supplied cooling air between the branches 151, 152 by directing the cooling air along opposing curved surfaces such as the first and second sides 161, 162 on either side of the apex 146 in the wedge 144. The air supplied along the sides 161, 162 can be directed into the corresponding cooling branches 151, 152 in order to cool the platform 100.

The various aspects described in the present disclosure have a variety of benefits, including that the curvilinear profile of the sides 161, 162 can better smooth and split the cooling air flow to the branches 151, 152 in the platform 100, as well as reducing stagnation in the region of the flow divider 142 and branches 151, 152. In addition, the smoothed splitting transition can reduce dump pressure losses, providing for improved cooling ability from the cooling airflow as well as reducing dust accumulation in the platform 100. It can be appreciated that improved cooling ability and dust removal can increase the longevity of components used in the environment of the turbine engine 10.

It can be further appreciated that the formation of cavities defining the first and second branches 151, 152 can reduce the weight of the airfoil assembly 99, which can increase the efficiency of the turbine engine 10.

It should be understood that application of the disclosed design is not limited to turbine engines with fan and booster sections, but is applicable to turbojets and turboshaft engines as well. In addition, the disclosed design may be used in other components within the turbine engine 10 such as any blade assembly or vane assembly in the compressor section 22 or turbine section 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly for a turbine engine comprising:
   a platform having first and second opposing surfaces;
   an airfoil extending from the first surface;
   a base extending from the second surface;
   an airfoil cooling circuit passing through the base, platform and into an interior of the airfoil; and
   a platform cooling circuit comprising first and second branches supplied by a common feed tube, with a flow divider comprising an apex confronting the feed tube and dividing fluid from the feed tube between the first and second branches.

2. The airfoil assembly of claim 1 wherein the flow divider evenly divides the fluid from the feed tube between the first and second branches.

3. The airfoil assembly of claim 1 wherein the flow divider unevenly divides the fluid from the feed tube between the first and second branches.

4. The airfoil assembly of claim 1 wherein the flow divider comprises a wedge having the apex confronting the feed tube.

5. The airfoil assembly of claim 4 wherein the wedge has opposing sides extending from the apex.

6. The airfoil assembly of claim 5 wherein at least one of the opposing sides is angled relative to a centerline of the feed tube.

7. The airfoil assembly of claim 6 wherein the at least one of the opposing sides has a curvilinear profile.

8. The airfoil assembly of claim 7 wherein both the opposing sides has a curvilinear profile.

9. The airfoil assembly of claim 6 wherein the centerline intersects the apex.

10. The airfoil assembly of claim 1 wherein the first and second branches extend along different portions of the platform.

11. The airfoil assembly of claim 1 wherein the first branch extends along a leading edge of the platform.

12. The airfoil assembly of claim 11 wherein the second branch extends along a side of the platform.

13. The airfoil assembly of claim 12 wherein at least one of the first and second branches also extends along a trailing edge of the platform.

14. The airfoil assembly of claim 1 further comprising film holes in the first surface, with the film holes fluidly coupled to one of the first and second branches.

15. The airfoil assembly of claim 1 wherein the feed tube is fluidly coupled to the airfoil cooling circuit.

16. The airfoil assembly of claim 1 wherein the base comprises a dovetail.

17. The airfoil assembly of claim 1 wherein the airfoil has an outer wall bounding the interior of the airfoil and defining a pressure side and a suction side extending axially between a leading edge to a trailing edge to define a chord-wise direction and extending radially between a root and a tip to define a span-wise direction, with the root being adjacent the platform.

18. The airfoil assembly of claim 17 wherein the airfoil cooling circuit comprises a serpentine cooling circuit located within the interior of the airfoil.

19. The airfoil assembly of claim 17 wherein the flow divider comprises opposing sides extending from the apex.

20. The airfoil assembly of claim 19 wherein the opposing sides are angled relative to a centerline of the feed tube.

21. The airfoil assembly of claim 20 wherein the opposing sides have a curvilinear profile.

22. The airfoil assembly of claim 21 wherein the centerline intersects the apex.

23. A method of cooling a platform of an airfoil assembly having a platform supporting an airfoil, the method comprising:
supplying cooling air from a feed tube to at least two cooling branches within the platform; and
dividing the supplied cooling air between the at least two cooling branches by directing the cooling air onto an apex formed by opposing curved surfaces.

24. The method of claim 23 wherein supplying cooling air further comprises supplying air from the curved surfaces and into the corresponding cooling branches.

25. An airfoil assembly for a turbine engine comprising:
a platform having first and second opposing surfaces;
an airfoil extending from the first surface;
a base extending from the second surface;
an airfoil cooling circuit passing through the base, platform and into an interior of the airfoil;
a platform cooling circuit comprising first and second branches supplied by a common feed tube, with a flow divider confronting the feed tube and dividing fluid from the feed tube between the first and second branches; and
at least one film hole in the first surface fluidly coupled to at least one of the first or second branches.

26. The airfoil assembly of claim 25 wherein the flow divider evenly divides the fluid from the feed tube between the first and second branches.

27. The airfoil assembly of claim 25 wherein the flow divider unevenly divides the fluid from the feed tube between the first and second branches.

28. The airfoil assembly of claim 25 wherein the flow divider comprises a wedge having an apex confronting the feed tube.

29. The airfoil assembly of claim 28 wherein the wedge has opposing sides extending from the apex.

30. The airfoil assembly of claim 29 wherein at least one of the opposing sides is angled relative to a centerline of the feed tube.

31. The airfoil assembly of claim 30 wherein the at least one of the opposing sides has a curvilinear profile.

32. The airfoil assembly of claim 31 wherein both the opposing sides has a curvilinear profile.

33. The airfoil assembly of claim 30 wherein the centerline intersects the apex.

34. The airfoil assembly of claim 25 wherein the first and second branches extend along different portions of the platform.

35. The airfoil assembly of claim 25 wherein the first branch extends along a leading edge of the platform.

36. The airfoil assembly of claim 35 wherein the second branch extends along a side of the platform.

37. The airfoil assembly of claim 36 wherein at least one of the first and second branches also extends along a trailing edge of the platform.

38. The airfoil assembly of claim 25 wherein the feed tube is fluidly coupled to the airfoil cooling circuit.

39. The airfoil assembly of claim 25 wherein the base comprises a dovetail.

40. The airfoil assembly of claim 25 wherein the airfoil has an outer wall bounding the interior of the airfoil and defining a pressure side and a suction side extending axially between a leading edge to a trailing edge to define a chord-wise direction and extending radially between a root and a tip to define a span-wise direction, with the root being adjacent the platform.

41. The airfoil assembly of claim 40 wherein the airfoil cooling circuit comprises a serpentine cooling circuit located within the interior of the airfoil.

42. The airfoil assembly of claim 40 wherein the flow divider comprises an apex confronting the feed tube.

43. The airfoil assembly of claim 42 wherein the flow divider comprises opposing sides extending from the apex.

44. The airfoil assembly of claim 43 wherein the opposing sides are angled relative to a centerline of the feed tube.

45. The airfoil assembly of claim 44 wherein the opposing sides have a curvilinear profile.

46. The airfoil assembly of claim 45 wherein the centerline intersects the apex.

47. A method of cooling a platform of an airfoil assembly having a platform supporting an airfoil, the method comprising:
supplying cooling air from a feed tube to at least two cooling branches within the platform; and
dividing the supplied cooling air between the at least two cooling branches by directing the cooling air along opposing curved surfaces; and
flowing cooling air from at least one of the at least two cooling branches to a surface of the platform via a film hole.

48. The method of claim 47 wherein supplying cooling air further comprises supplying air from the curved surfaces and into the corresponding cooling branches.

49. The method of claim 47 wherein dividing the supplied cooling air comprises directing the cooling air into an apex formed by the curved surfaces.

\* \* \* \* \*